US006750426B2

United States Patent
Veikkolainen et al.

(10) Patent No.: US 6,750,426 B2
(45) Date of Patent: Jun. 15, 2004

(54) WELDING ARRANGEMENT AND METHOD

(75) Inventors: Mikko Veikkolainen, Espoo (FI); Juhani Säikkö, Helsinki (FI)

(73) Assignee: Kvaerner Masa-Yards Oy, Helsinki (FI)

( * ) Notice: Subject to any disclaimer, the term of this patent is extended or adjusted under 35 U.S.C. 154(b) by 0 days.

(21) Appl. No.: 09/941,485

(22) Filed: Aug. 28, 2001

(65) Prior Publication Data

US 2002/0046999 A1 Apr. 25, 2002

(30) Foreign Application Priority Data

Aug. 29, 2000 (FI) .............................. 20001907

(51) Int. Cl.[7] .............................................. B23K 9/095
(52) U.S. Cl. ................................................. 219/124.34
(58) Field of Search ........................ 219/125.1, 124.34, 219/125.11; 901/1, 4, 42

(56) References Cited

U.S. PATENT DOCUMENTS

| 4,144,992 A | * | 3/1979 | Omae et al. ........... 219/125.11 |
| 4,697,239 A | * | 9/1987 | Sicard et al. ................... 901/1 |
| 5,572,102 A |   | 11/1996 | Goodfellow et al. |
| 5,699,444 A |   | 12/1997 | Palm |
| 5,798,627 A | * | 8/1998 | Gilliland et al. ............... 901/4 |
| 5,999,642 A |   | 12/1999 | Gilliland |

FOREIGN PATENT DOCUMENTS

| CN | 1118297 | 3/1996 |
| FI | 73615 | 7/1987 |
| FI | 101689 | 8/1998 |
| JP | 9061117 | 3/1997 |

OTHER PUBLICATIONS

"McGraw–Hill Dictionary of Scientific and Technical Terms", fourth edition, 1989, p. 1481.

* cited by examiner

*Primary Examiner*—Clifford C. Shaw
(74) *Attorney, Agent, or Firm*—John Smith-Hill; Smith-Hill and Bedell

(57) ABSTRACT

Constituent pieces of a structure to be welded are arranged in a desired configuration on a support surface and are welded together at a plurality of weld points to form the welded structure. At least one image of the arrangement of the constituent pieces on the support surface is recorded and the positions of the weld points are determined from the image(s). The welding of the constituent pieces is controlled on the basis of the determined positions of the weld points.

24 Claims, 4 Drawing Sheets

WELDING ARRANGEMENT AND METHOD

BACKGROUND OF THE INVENTION

This invention relates to a method of forming a welded structure from a number of constituent pieces. The invention also relates to an arrangement for forming a welded structure.

In traditional welding operations for the production of small batches of welded structures the welding is normally performed at least mainly manually. This is because the main parts of most structures are neither technically nor economically suitable for welding using present automatic welding apparatus. With the welding of small batches, known welding apparatus is suitable only for welding very accessible, long and straight welds. However often the majority of welds in a welded structure are for joining relatively short intersecting structures whose accessibility is limited by the surrounding constructions. This is a particular problem in shipbuilding, where the number and relatively large size of different parts cause problems. The manual welding of such structures is both expensive and time-consuming.

Welding systems have been developed where the structure to be welded is followed according to its form or shape using different kinds of control arrangements. One such known welding system is disclosed in DE-A-2240949, wherein a steering wheel is used to control the path taken by welding apparatus. In U.S. Pat. No. 5,307,979 a welding system is disclosed in which a rail-based control arrangement is provided for welding three-dimensional structures. In DE-A-2035498 a system for welding tires is disclosed.

Automatic welding systems are disclosed in U.S. Pat. No. 4,737,614, in which a control system is based on variations in the intensity of light, and in U.S. Pat. No. 5,572,102 in which a welding robot system is employed based on fluorescent light.

Welding benches have also been developed which can be adjusted according to the structure to be welded; see for example EP-A-0092533. It is also known to automatically weld pipes as disclosed in SE publication 455581.

There are considerable disadvantages with known welding techniques and in particular in most cases it is not possible to apply them to the ship building industry. Generally for a ship, welded structures are required which have relatively large dimensions, typically over 10 m wide and often even nearly 20 m long. When transverse and longitudinal constructions are attached to these structures the welding usually has to be performed by hand which takes a great deal of time. The use of thinned materials and the use of, e.g., reduced "throat" thicknesses, has additionally caused the nature of welding to change. Welding has also become ergonomically difficult because of increased welding speeds. Furthermore the use of a skilled welder for relatively simple but tedious welding work is impractical since it wastes the ability of the skilled welder. It is more sensible to use manpower for meaningful work which a machine cannot do.

An aim of the present invention is to eliminate these disadvantages associated with known welding techniques and to achieve a totally novel solution for welding together a plurality of typically differently shaped pieces, the welding operation being easy to control and to adapt to different circumstances. It is also intended to be able to adapt the invention to different technical fields where there are requirements for welding pieces having a great multiformity and diversity. Examples of fields where the invention has applicability are paper machines, general building applications, bridge and train building, and heavy vehicle, e.g. truck, manufacture.

SUMMARY OF THE INVENTION

According to a first aspect of the present invention there is provided a method of forming a welded structure comprising arranging on constituent pieces of the structure to be welded on a support surface in a desired configuration, recording at least one image of the arrangement of the constituent pieces on the support surface, determining from the image(s) the positions of a plurality of weld points, welding with welding apparatus the constituent pieces together at said weld points to form the welded structure, and controlling the welding of the constituent pieces with said welding apparatus on the basis of the determined positions of the weld points.

According to a second aspect of the present invention there is provided a method of forming a large welded structure, for example a part or parts of a ship, a paper machine, a building, a train or a truck, comprising arranging constituent pieces of the structure to be welded on a support surface in a desired configuration, recording at least one image of the arrangement of the constituent pieces on the support surface, determining from the image(s) the positions of a plurality of weld points, welding with welding apparatus the constituent pieces together at said weld points to form the welded structure, and controlling the welding of the constituent pieces with said welding apparatus on the basis of the determined positions of the weld points.

According to a third aspect of the present invention there is provided a welding arrangement for forming a welded structure from a plurality of constituent pieces, comprising a support surface for supporting the constituent pieces in the configuration of a structure to be welded, camera means for providing an image of the structure to be welded, evaluating means for determining the positions of weld points of the structure to be welded based on the image provided by the camera means, welding apparatus for welding together the constituent pieces of the structure at the positions of the weld points determined by the evaluating means.

The invention is based on the idea that the pieces to be welded are placed on a support surface in their desired final positions. The support surface can be an immovable surface, e.g. held against movement, or a movable base or floor surface whose position is known. Suitably a support structure or supporting construction is supported on the support surface or on side rails and spans across the support surface. Camera or photography means for photographically recording the arrangement of the pieces to be welded, and possibly also the welding apparatus, are conveniently mounted on the support structure. Both the camera or photography means and the welding apparatus are preferably intended to be mounted for movement over, or relative to, the support surface in the z-, y- and z-axes. One or more camera or photography means may be provided and/or one or more welding apparatus may be provided.

The invention enables the constituent pieces of one or more structures to be welded together. The dimensions of the structure and of its constituent pieces are photographically recorded to enable the different weld points to be determined. These weld points can be determined by scanning or reading the photographically recorded information and passing the scanned or read information to control means. The control means is used to control the welding together of the pieces of the structure to be welded based on the determined positions of the weld points. The scanned or read photographic information may be stored or recorded in memory means, e.g. of a scanning/reading apparatus, of the welding apparatus and/or of the camera or photography means.

One or more display devices displaying, for example the positions of the weld points, may be provided to enable a user to override automatic control of the welding apparatus during welding of the structure. Alternatively, however, the welding operation may be performed automatically or semi-automatically by the welding apparatus, in the form of a welding robot or manipulator.

Conveniently the camera or photography means is used to acquire views of the structure to be welded, these photographed views being used to enable reader/scanner apparatus, either automatically or with assistance of a user, to identify and define the positions of the weld points. Once the weld points are so defined they are used for the manual, semi-automatic or automatic welding of the constituent pieces of the structure to be welded. The actual welding may be accomplished by arc welding, e.g. gas arc welding, with the welding apparatus following the shape or form of the structure and performing the welding operations at the various defined weld points. Since the welding apparatus is preferably movable both horizontally and vertically over the structure it is able to weld the structure at different heights and positions over the support surface. The pieces can be very large, for example the invention makes it easy and economical to weld parts, for example, of a ship, a paper machine, a building, a train or a truck.

According to a fourth aspect of the present invention there is provided a method of welding a structure composed of a number of constituent pieces, comprising identifying optimal weld points for joining the pieces of the structure, and guiding welding apparatus to the weld points.

Optionally a user is able to modify or override the positioning of the welding apparatus. For instance the user is able either to approve or to reject an automatically selected method of welding the structure at each weld point.

The structure can be scanned by the camera or photography means by moving the supporting structure over the support surface and arranging for the camera or photography means to move across and vertically up and down as required. Alternatively the supporting structure may be stationary or immovable and the pieces to be welded may moved, e.g. on a movable support surface, by hand, semi-automatically or automatically beneath the supporting construction. In this way the pieces of the structure to be welded are "photographed" and a picture map of the structure is generated and a welding map is created with the aid of a computer.

Conveniently the welding system, based on the welding map, automatically recognizes so-called standard welds, characteristics of which may, for example, be pre-learnt by the computer, so that the system can automatically instruct a welding robot or the like to commence welding.

It is also possible for a user, viewing the welding map, to select alternative starting points for a welding operation, and to select suitable welding methods for specific types of weld, whereupon the user can instruct the welding robot(s) to commence the welding operation. Several different welding apparatus can be mounted on the supporting construction itself depending on the materials to be welded.

By the invention noticeable benefits are obtained. In particular a low cost welding system can be provided in which welding apparatus (robots) can be taught to weld separate pieces together. Additionally the system is able to cater for the welding together of pieces having different shapes and sizes. Typically the welding method can be used to program the welding of small batch productions, the welding of serial production products and the welding of prototypes or the like.

BRIEF DESCRIPTION OF THE DRAWINGS

Embodiments of the invention will now be described, by way of example only, with particular reference to the accompanying drawings, in which.

DETAILED DESCRIPTION

Figure 1:
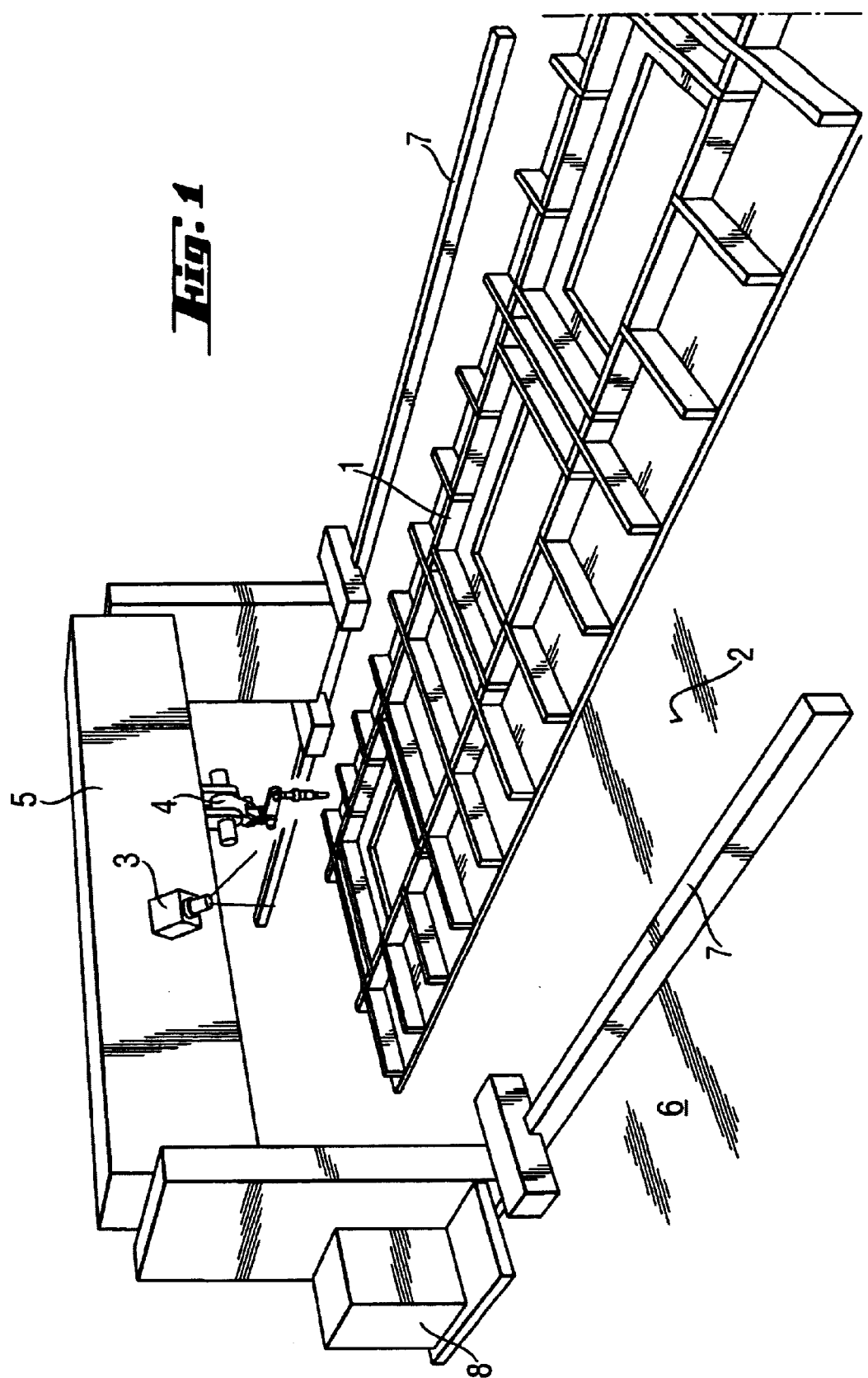
FIG. 1 is a view of a welding arrangement incorporating a support construction.

FIG. 1 shows a welding station or arrangement in which a plurality of constituent pieces of a structure 1 to be welded are supported on a support surface 2. The pieces may be moved onto the support surface manually, with a crane or with automated material management means. A camera 3 and a welding machine 4 are attached to a transverse supporting construction or support structure 5 which spans the support surface 2 and is movable over the support surface, along its length, by the provision of side rails 7 mounted on floor 6 and running each side of the support surface 2. Operating devices 8 for operating the supporting construction 5 and/or for operating the welding apparatus 4 and/or for operating the camera 3 can be situated in the immediate vicinity of the supporting construction 5.

The term "camera" is intended to cover any imaging means able to provide an image of the structure to be welded and may comprise conventional photography apparatus, e.g. a video camera or still camera, imaging means recording infrared or ultra violet radiation, laser means or the like. More than one such camera 3 may be provided.

Figure 2:
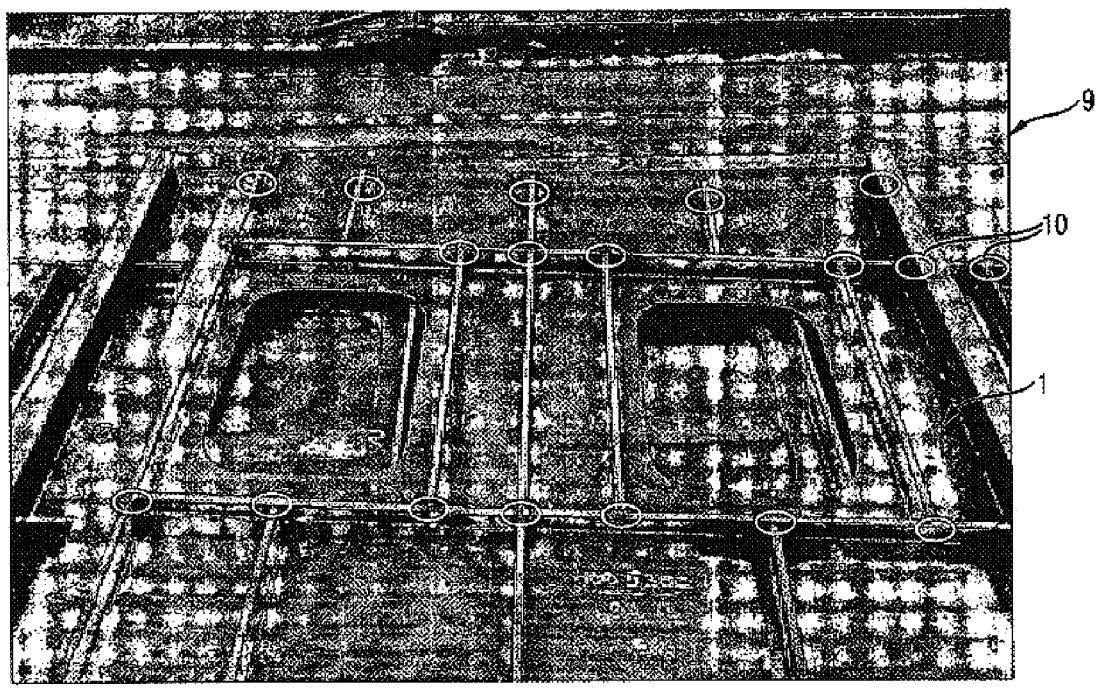
FIG. 2 is a photograph of a structure to be welded taken by camera or photography means.

FIG. 2 is an image in the form of a photograph 9 of the structure to be welded taken by the camera 3. The photograph is marked, manually or automatically, with white circles 10 to indicate different junction points for the various pieces of the structure, which are the different points to be welded (i.e. "weld points"). A user is able to refer to the weld points, to provide more information for the type of welds required and to define a suitable welding method for each weld point.

Figure 3:
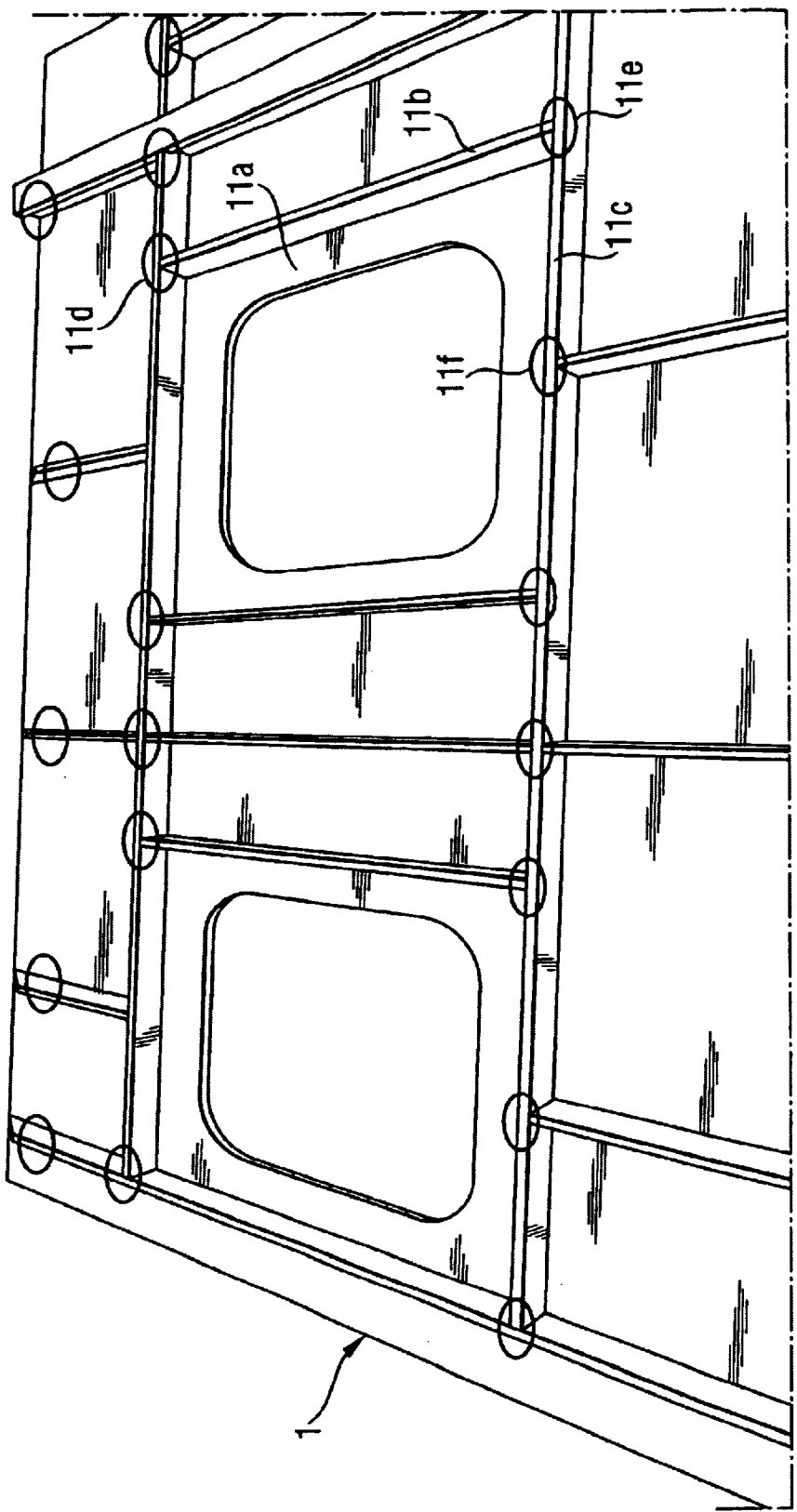
FIG. 3 is a representation of the structure to be welded formed by evaluation of the photograph shown in FIG. 2.

FIG. 3 illustrates a visual representation of the structure 1 to be welded produced automatically and/or with the assistance of input from a user, from the photograph 9 shown in FIG. 2. The visual representation identifies, either automatically or with the help of user input, different pieces 11a, 11b and 11c of the structure and different fastening places (i.e. weld points) 11d, 11e and 11f and also provides instructions for welding the weld pieces together. The user is given the opportunity whether to approve or to reject a starting point 11d, 11e or 11f for the welding procedure and whether to approve or to reject welding methods proposed by the system. In the event that the user rejects the starting point proposed by the system, the system may propose another starting point. The welding system can thus be regarded as being semi-automatic.

Figure 4:
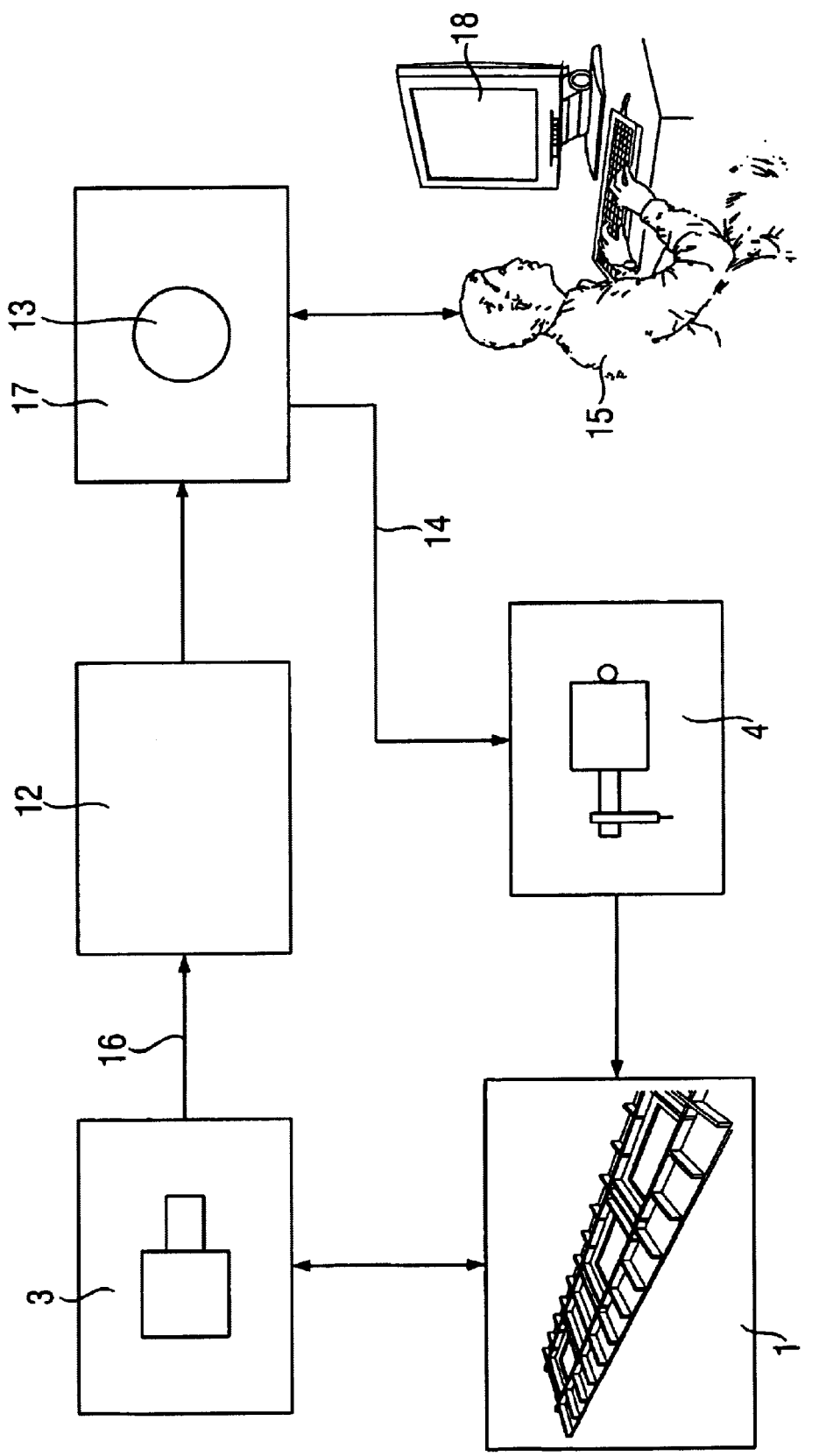
FIG. 4 is a schematic representation of a control system for controlling the welding of a structure.

FIG. 4 shows a diagram of one form of control system for controlling the welding operation. The camera 3 first photographs the structure 1 to be welded and transmits this information 16 using a reader or scanner apparatus 12 to a control system 13 of an external device 17. The reader apparatus 12, either automatically or with the assistance of a user 15, supplies control information 14 to the welding apparatus 4. The user 15 is able to follow the movements of the camera 3 and/or the welding apparatus on a display device 18. The reader/scanner apparatus 12 and/or the control system 13 may be situated in or on the camera 3, in or on the welding apparatus 4 or in or on a combination of them. The welding apparatus may, for example, be a welding robot or manipulator.

The welding system thus enables a welding procedure which can be performed completely automatically or with control input from a user. Additionally the flexibility of the system gives possibilities for welding of many kinds of structures without the time consuming need to fasten the apparatus and make calibrations.

The camera 3 may be mounted on the welding apparatus 4. The supporting construction 5 can be for example pneumatically, hydraulically or electromechanically actuated.

Other embodiments of the invention are feasible within the scope of the ensuing claims.

What is claimed is:

1. A method of forming a welded structure comprising:
   arranging constituent pieces of the structure to be welded on a support surface in a desired configuration,
   recording at least one extended two-dimensional image of the arrangement of the constituent pieces on the support surface,
   determining the positions of a plurality of weld points by viewing the two-dimensional image(s),
   receiving a user input that specifies a welding method for each weld point,
   welding with welding apparatus the constituent pieces together at said weld points in accordance with the respective specified welding methods to form the welded structure, and
   controlling the welding of the constituent pieces with said welding apparatus on the basis of the determined positions of the weld points.

2. A method according to claim 1, comprising recording the at least one image in memory of a reader apparatus.

3. A method according to claim 1, comprising recording the at least one image in memory.

4. A method according to claim 3, comprising recording the at least one image in memory of the camera means (3), or in memory of the welding apparatus (4), or in a combined memory for the camera means (3) and the welding apparatus (4).

5. A method according to claim 1, comprising recording the at least one image in memory of a device external to the camera means.

6. A method according to claim 1, wherein the method further comprises displaying the positions of the weld points on a display device for assisting a user to control guiding of the welding apparatus.

7. A method according to claim 1, comprising providing a user with the ability to override automatic control of the welding of the constituent pieces.

8. A method according to claim 1, comprising using control information to guide movement of the welding apparatus.

9. A method according to claim 1, comprising welding the structure automatically with the assistance of a user.

10. A method according to claim 1, comprising welding the constituent pieces together using a welding robot or a manipulator.

11. A method according to claim 1, comprising determining the positions of the weld points from the at least one image either automatically or with the assistance of a user.

12. A method according to claim 11, further comprising determining the type of welding of each weld point and determining whether the welding should be performed manually, semi-automatically or automatically.

13. A method according to claim 1, comprising welding the constituent pieces together by arc welding.

14. A method according to claim 1, comprising guiding the welding apparatus to follow the shape or form of the structure during the welding.

15. A method according to claim 1, comprising recording the extended image photographically.

16. A method according to claim 1, wherein the step of determining the positions of a plurality of weld points by viewing the two-dimensional image(s) comprises determining the positions of a plurality of potential weld points, the method further comprises receiving a user input that accepts or rejects each potential weld point, and the step of receiving a user input that specifies a welding method for each weld point comprises receiving a user input that specifies a welding method for each accepted weld point.

17. A method of forming a large welded structure, comprising:
   arranging constituent pieces of the structure to be welded on a support surface in a desired configuration,
   recording at least one extended two-dimensional image of the arrangement of the constituent pieces on the support surface,
   determining the positions of a plurality of weld points by viewing the two-dimensional image(s),
   receiving a user input that specifies a welding method for each weld point,
   welding with welding apparatus the constituent pieces together at said weld point in accordance with the respective specified welding methods to form the welded structure, and
   controlling the welding of the constituent pieces with said welding apparatus on the basis of the determined positions of the weld points.

18. A method according to claim 17, wherein the step of determining the positions of a plurality of weld points by viewing the two-dimensional image(s) comprises determining the positions of a plurality of potential weld points, the method further comprises receiving a user input that accepts or rejects each potential weld point, and the step of receiving a user input that specifies a welding method for each weld point comprises receiving a user input that specifies a welding method for each accepted weld point.

19. A welding arrangement for forming a welded structure from a plurality of constituent pieces, comprising
   a support surface for supporting the constituent pieces in the configuration of a structure to be welded,
   camera means for providing an extended two-dimensional image of the structure to be welded,
   evaluating means for determining the positions of weld points of the structure to be welded based on the two-dimensional image provided by the camera means,
   input means for receiving user input specifying a welding method for each weld point, and welding apparatus for welding together the constituent pieces of the structure at the positions of the weld points determined by the evaluating means in accordance with the respective specified welding methods.

20. A welding arrangement according to claim 19, wherein the evaluating means includes means for identifying the constituent pieces of the structure to be welded and for determining the optimal method of welding the identified constituent pieces.

21. A welding arrangement according to claim 19, including control means for guiding the welding apparatus during welding of a structure.

22. A welding arrangement according to claim 19, including override means for allowing a user to override control of the welding apparatus.

23. A welding arrangement according to claim 19, including override means for a user either to accept or to reject automatic control of the welding apparatus and to control the welding of a part or parts of the structure if automatic control is rejected.

24. An arrangement according to claim 19, wherein the evaluating means for determining the positions of weld points of the structure to be welded comprises means for determining the positions of potential weld points, the input means comprises means for receiving user input for accepting or rejecting each potential weld point and for receiving a user input that specifies a welding method for each accepted weld point, and the welding apparatus comprises apparatus for welding together the constituent pieces of the structure at the positions of the accepted weld points.

* * * * *